United States Patent
Liu et al.

(10) Patent No.: US 12,486,111 B2
(45) Date of Patent: Dec. 2, 2025

(54) ELECTRONIC DEVICE AND METHOD FOR MANAGING SHELF CONFIGURATION IN WAREHOUSE

(71) Applicant: Industrial Technology Research Institute, Hsinchu (TW)

(72) Inventors: Li-Yi Liu, Taipei (TW); Po-Yu Huang, Yunlin County (TW); Wei-Kang Liang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 545 days.

(21) Appl. No.: 18/081,690

(22) Filed: Dec. 15, 2022

(65) Prior Publication Data

US 2024/0199332 A1     Jun. 20, 2024

(51) Int. Cl.
*B65G 1/137*     (2006.01)

(52) U.S. Cl.
CPC ......... *B65G 1/1373* (2013.01); *B65G 1/1371* (2013.01)

(58) Field of Classification Search
CPC ...... B65G 1/1373; B65G 1/1371; B65G 1/00; G06Q 10/087
See application file for complete search history.

(56) References Cited

U.S. PATENT DOCUMENTS

| | | |
|---|---|---|
| 11,004,032 B2 | 5/2021 | Wolf et al. |
| 11,367,044 B2 | 6/2022 | Jiang et al. |
| 2021/0110334 A1 | 4/2021 | Singh et al. |

FOREIGN PATENT DOCUMENTS

| | | |
|---|---|---|
| CN | 109086921 | 12/2018 |
| CN | 110189068 | 8/2019 |
| TW | I615337 | 2/2018 |
| TW | 202011297 | 3/2020 |

OTHER PUBLICATIONS

"Office Action of Taiwan Counterpart Application", issued on Jun. 21, 2023, p. 1-p. 15.
"Office Action of Taiwan Counterpart Application", issued on Nov. 7, 2024, p. 1-p. 3.

*Primary Examiner* — Jacob S. Scott
*Assistant Examiner* — Miraj T. Patel
(74) *Attorney, Agent, or Firm* — JCIPRNET

(57) ABSTRACT

The invention provides an electronic device and a method for managing a shelf configuration in a warehouse. The method includes the following. A number of aisles is obtained by using a number-of-aisles-optimization-function associated with warehouse-structure-information. A number of turnstiles is obtained by using a number-of-turnstiles-optimization-function associated with the warehouse-structure-information. A commodity placement mode is obtained by using a commodity-score-function associated with order information and commodity information. The number of aisles, the number of turnstiles, and the commodity placement mode are used as a warehouse shelf configuration result.

14 Claims, 7 Drawing Sheets

Warehouse-structure-information

Warehouse-structure-information with number of aisles updated

Warehouse-structure-information with
number of aisles and number of turnstiles updated Order information

| Order number | Required commodity |
|---|---|
| A | a, b, c, d |
| B | a, e, f |
| C | a, b, c |

Commodity information

| Commodity number | Volume | Weight | Inventory level |
|---|---|---|---|
| a | 10 | 20 | 500 |
| b | 200 | 50 | 100 |
| c | 50 | 70 | 300 |

FIG. 7

Warehouse shelf configuration result

Warehouse shelf configuration result

ELECTRONIC DEVICE AND METHOD FOR MANAGING SHELF CONFIGURATION IN WAREHOUSE

BACKGROUND

Technical Field

The invention relates to an electronic device and a method for managing a shelf configuration in a warehouse.

Description of Related Art

In recent years, the world has been severely affected by inflation, which has led to a sharp increase in warehouse operating costs and transportation costs in the logistics industry. How to optimize the operational efficiency of the warehouse without increasing expenditure is one of the important keys for logistics/warehousing companies to maintain their own industrial competitiveness.

According to statistics, the moving time of vehicles in the warehouse accounts for more than 60% of the total operating time. If the shelf locations and the commodity placement locations are not properly planned, the moving time required for the vehicle to store and pick commodities is increased and the space for storing commodities in the warehouse is wasted, which seriously affects the inventory capacity and operational efficiency of the warehouse. Common warehousing problems such as limited warehousing space, limited picking equipment, and too many orders affect the delivery time, which often needs to be delayed for several days, and even dozens of days under the impact of the epidemic, resulting in a large number of delayed delivery losses and delays in time of receiving new orders.

SUMMARY

The object of the invention is to provide an electronic device and a method for managing a shelf configuration in a warehouse, which can improve the operational efficiency of the warehouse and the efficiency of a vehicle to store and pick orders.

An electronic device for managing a shelf configuration in a warehouse of the invention includes a storage medium and a processor. The storage medium stores warehouse-structure-information of the warehouse, order information, and commodity information. The processor is coupled to the storage medium and configured to perform the following. A number of aisles is obtained by using a number-of-aisles-optimization-function associated with the warehouse-structure-information. A number of turnstiles is obtained by using a number-of-turnstiles-optimization-function associated with the warehouse-structure-information. A commodity placement mode is obtained by using a commodity-score-function associated with the order information and the commodity information. The number of aisles, the number of turnstiles, and the commodity placement mode are used as a warehouse shelf configuration result.

A method for managing a shelf configuration in a warehouse of the invention includes the following. A number of aisles is obtained by using a number-of-aisles-optimization-function associated with warehouse-structure-information. A number of turnstiles is obtained by using a number-of-turnstiles-optimization-function associated with the warehouse-structure-information. A commodity placement mode is obtained by using a commodity-score-function associated with order information and commodity information. The number of aisles, the number of turnstiles, and the commodity placement mode are used as a warehouse shelf configuration result.

The electronic device and the method for managing the shelf configuration in the warehouse of the invention can obtain the updated number of aisles and number of turnstiles by using the number-of-aisles-optimization-function and the number-of-turnstiles-optimization-function. Furthermore, the commodity placement mode can also be obtained by using the commodity-score-function. Based on this, the operational efficiency of the warehouse and the efficiency of the vehicle to store and pick orders can be improved.

In order to make the above-mentioned features and advantages of the invention more comprehensible, the following specific embodiments are described in detail together with the accompanying drawings.

BRIEF DESCRIPTION OF THE DRAWINGS

FIG. 7 is a schematic diagram illustrating order information and commodity information according to an embodiment of the invention.

DESCRIPTION OF THE EMBODIMENTS

Figure 1:
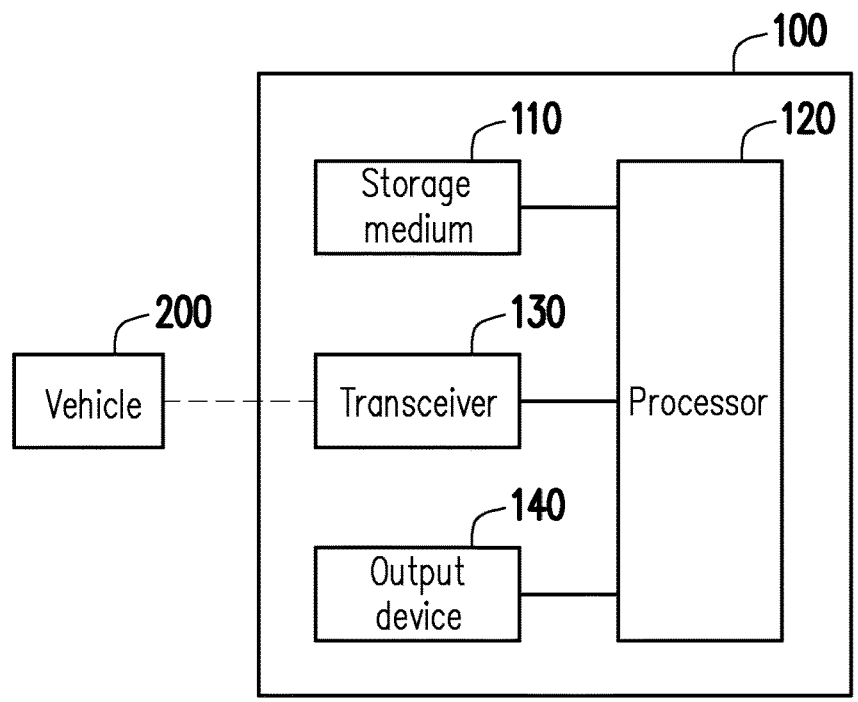
FIG. 1 is a schematic diagram illustrating an electronic device for managing a shelf configuration in a warehouse according to an embodiment of the invention.

FIG. 1 is a schematic diagram illustrating an electronic device 100 for managing a shelf configuration in a warehouse according to an embodiment of the invention. The electronic device 100 may include a storage medium 110 and a processor 120. The processor 120 is coupled to the storage medium 110. In other embodiments, the electronic device 100 may also include a transceiver 130 and an output device 140 coupled to the processor 120.

The storage medium 110 is, for example, any type of fixed or movable random access memory (RAM), read-only memory (ROM), flash memory, hard disk drive (HDD), solid state drive (SSD), similar components, or a combination of the above-mentioned components for storing multiple modules or various application programs executable by the processor 120. In this embodiment, the storage medium 110 may store warehouse-structure-information of a warehouse, order information, and commodity information. In other embodiments, the storage medium 110 may also store the number of shelves in the warehouse and a historical order information score. Subsequent embodiments will provide further illustrations.

The processor 120 is, for example, a central processing unit (CPU), other programmable general purpose or special purpose micro control units (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable gate arrays (FPGA), other similar components, or a combination of the above-mentioned components. The processor 120 may access and execute multiple modules and various application programs stored in the storage medium 110.

The transceiver 130 transmits and receives signals in a wireless or wired manner. The transceiver 130 is communicatively connected to a vehicle 200.

The output device 140 is, for example, a screen or a display.

Figure 2:
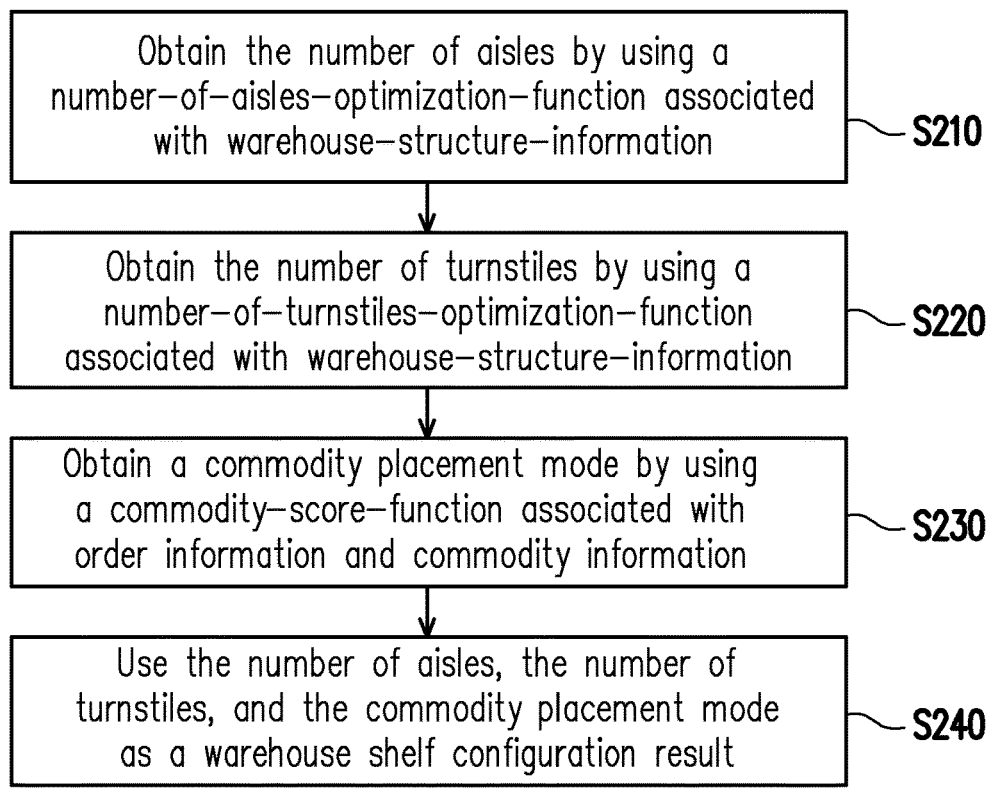
FIG. 2 is a flowchart illustrating a method for managing a shelf configuration in a warehouse according to an embodiment of the invention.

FIG. 2 is a flowchart illustrating a method for managing a shelf configuration in a warehouse according to an embodiment of the invention. Please refer to FIG. 1 and FIG. 2 at the same time. The method of this embodiment is applicable to the electronic device 100 in FIG. 1. The detailed steps of the method for managing the shelf configuration in the warehouse according to the invention will be described below together with various components of the electronic device 100.

In Step S210, the processor 120 may obtain the number of aisles by using a number-of-aisles-optimization-function associated with the warehouse-structure-information.

Figure 3:
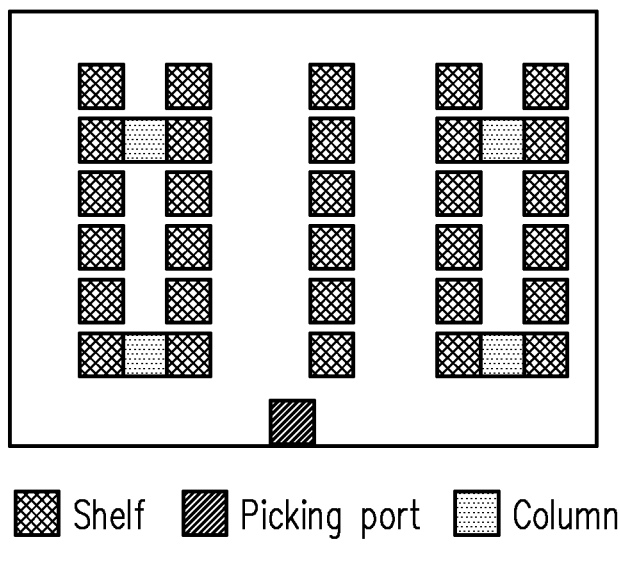
FIG. 3 is a schematic diagram illustrating warehouse-structure-information according to an embodiment of the invention.

FIG. 3 is a schematic diagram illustrating warehouse-structure-information according to an embodiment of the invention. Please refer to FIG. 1 and FIG. 3 at the same time. In this embodiment, the (original) warehouse-structure-information pre-stored in the storage medium 110 may indicate the number of at least one picking port, a warehouse width, an aisle width, a shelf width, a warehouse length, and an aisle spacing.

Figure 4:
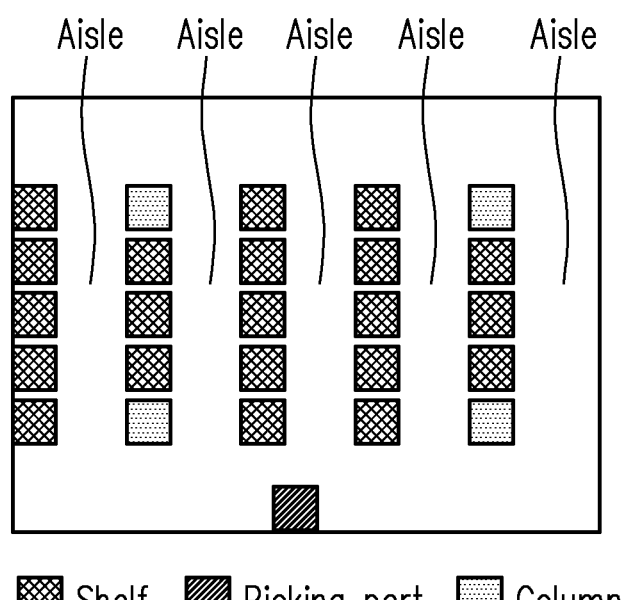
FIG. 4 is a schematic diagram illustrating warehouse-structure-information with the number of aisles updated according to an embodiment of the invention.

FIG. 4 is a schematic diagram illustrating warehouse-structure-information with the number of aisles updated according to an embodiment of the invention. Please refer to FIG. 1, FIG. 3, and FIG. 4 at the same time. In an embodiment, the number-of-aisles-optimization-function may be associated with the number of at least one picking port, the warehouse width, the aisle width, and the shelf width. For example, assuming N is the number of aisles, k is the number of at least one picking port, W is the warehouse width, $w_1$ is the aisle width, $w_2$ is the shelf width, and offset is a special warehouse terrain condition, such as a non-rectangular terrain. The processor 120 may obtain the number of aisles by using the following Formula 1, so as to obtain the warehouse-structure-information with the number of aisles updated as shown in FIG. 4 by using the warehouse-structure-information shown in FIG. 3. Thereby, a configuration of the aisles can be optimized.

$$N = k + \frac{W - 2 \times w_2}{w_1} + \text{offset} \quad \text{(Formula 1)}$$

In an embodiment, the processor 120 may set the picking port as a two-way aisle, and then set up an aisle for every two rows of shelves until a boundary of the warehouse, but the invention is not limited thereto.

Please refer back to FIG. 2. In Step S220, the processor 120 may obtain the number of turnstiles by using a number-of-turnstiles-optimization-function associated with the warehouse-structure-information.

In an embodiment, the number-of-turnstiles-optimization-function may include a first number-of-turnstiles-optimization-function. The first number-of-turnstiles-optimization-function may be associated with the warehouse length, the aisle width, the shelf width, the number of aisles, and the number of shelves (pre-stored in the storage medium 110). For example, assuming D is the warehouse length, i is the number of turnstiles, $w_1$ is the aisle width, $w_2$ is the shelf width, and min(n) is a minimum number of shelves. The processor 120 may use the following Formula 2 as the first number-of-turnstiles-optimization-function.

$$\frac{D - (i+1) \times w_1}{w_2} \times 2 \times N \geq \min(n) \quad \text{(Formula 2)}$$

In an embodiment, the number-of-turnstiles-optimization-function may include a second number-of-turnstiles-optimization-function. The second number-of-turnstiles-optimization-function may be associated with the number of aisles, the warehouse width, the number of at least one picking port, the aisle width, and the aisle spacing. For example, assuming N is the number of aisles, W is the warehouse width, and k is the number of at least one picking port, $w_1$ is the aisle width, and a is the aisle spacing. The processor 120 may use the following Formula 3 as the second number-of-turnstiles-optimization-function.

$$N = \frac{W - k \times w_1}{a} \quad \text{(Formula 3)}$$

Figure 5:
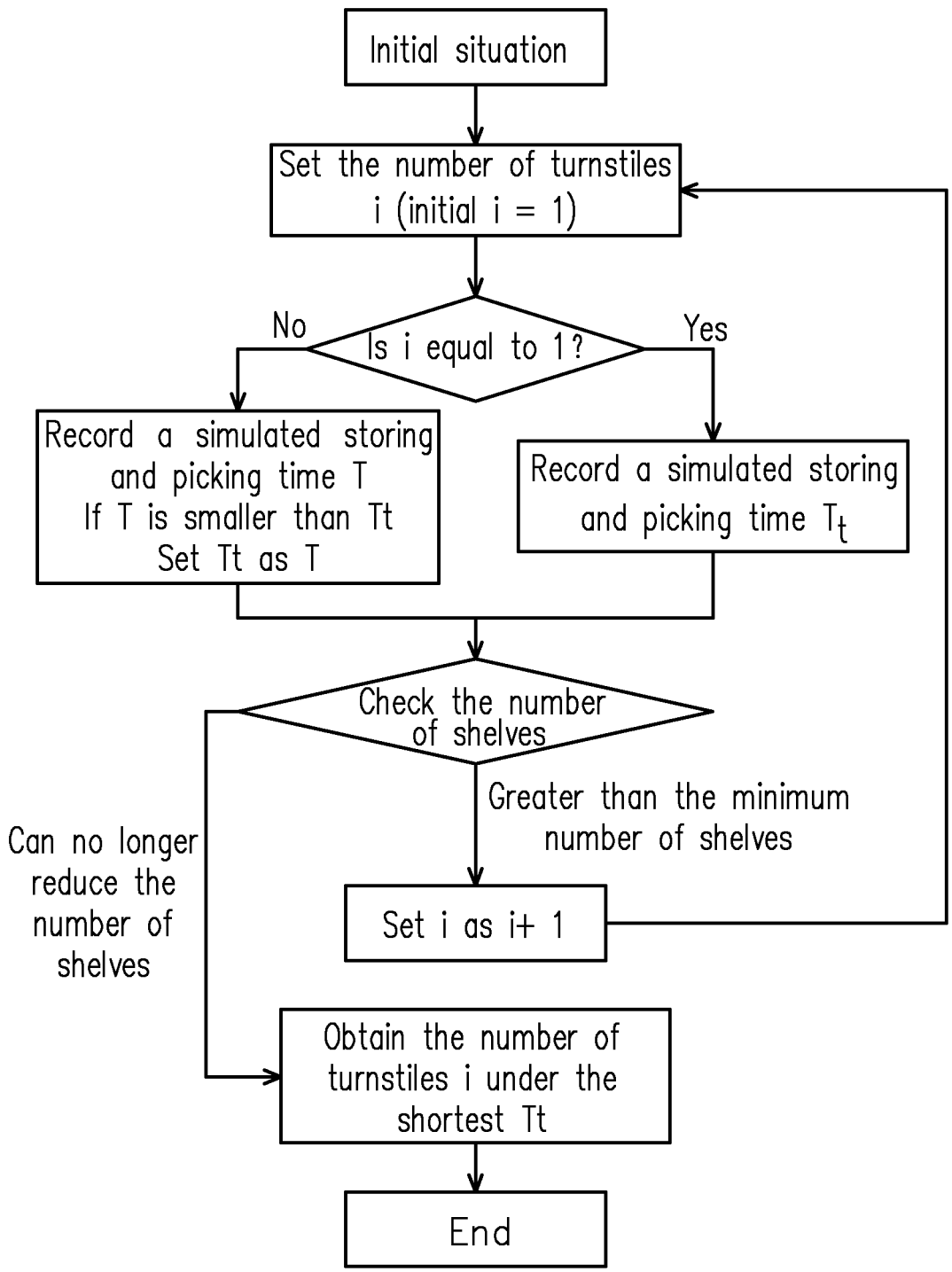
FIG. 5 is a flowchart illustrating obtaining the number of turnstiles according to an embodiment of the invention.

FIG. 5 is a flowchart illustrating obtaining the number of turnstiles according to an embodiment of the invention. FIG. 5 is a further illustration of the above-mentioned Formula 2. Please refer to FIG. 1, FIG. 4, and FIG. 5 at the same time. In this embodiment, the processor 120 may set an initial value of the number of turnstiles i of the warehouse-structure-information (with the number of aisles updated) shown in FIGS. 4 to 1. Then, the processor 120 may calculate a simulated storing and picking time $T_1$ of the vehicle 200. Next, the processor 120 may increase the number of turnstiles i to 2, and calculate a simulated storing and picking time $T_2$ of the vehicle 200. The above is repeated until the number of shelves reaches a minimum value (a minimum required number). Thereby, the processor 120 may find an optimal simulated storing and picking time T and the (optimal) number of turnstiles i.

The simulated storing and picking time is, for example, a picking time for the vehicle 200 to finish picking a specific order randomly placed in the warehouse-structure-information in FIG. 4. However, the invention is not limited thereto.

Figure 6:
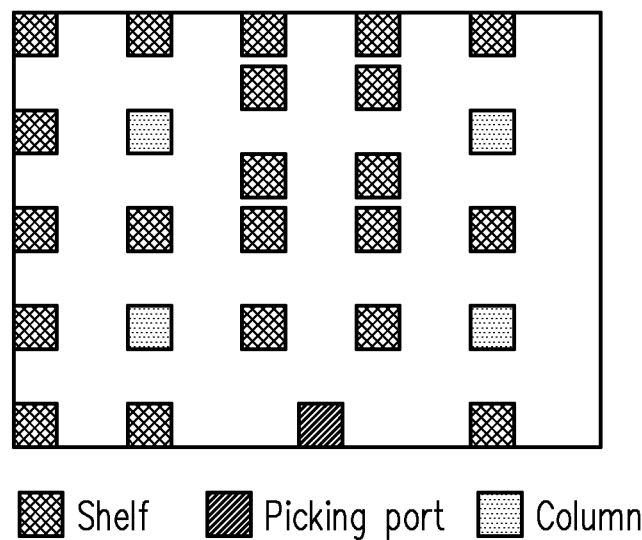
FIG. 6 is a schematic diagram illustrating warehouse-structure-information with the number of aisles and the number of turnstiles updated according to an embodiment of the invention.

FIG. 6 is a schematic diagram illustrating warehouse-structure-information with the number of aisles and the number of turnstiles updated according to an embodiment of the invention. Please refer to FIG. 1, FIG. 4, FIG. 5, and FIG. 6 at the same time. The processor 120 may obtain the warehouse-structure-information with the number of aisles and the number of turnstiles updated shown in FIG. 6 by using the above Formula 2, Formula 3, the warehouse-structure-information (with the number of aisles updated) shown in FIG. 4, and the flowchart shown in FIG. 5. That is to say, the invention may increase a movable path of the vehicle 200 by increasing the number of turnstiles, so as to maximize the storing and picking efficiency of the vehicle 200. In this embodiment, a direction of the turnstiles is, for example, perpendicular to a direction of the aisles, but the invention is not limited thereto.

Please refer back to FIG. 2. In Step S230, the processor 120 may obtain a commodity placement mode by using a commodity-score-function associated with the order information and the commodity information.

FIG. 7 is a schematic diagram illustrating order information and commodity information according to an embodiment of the invention. In this embodiment, the order information pre-stored in the storage medium 110 may include an order number and the required commodity, and the commodity information pre-stored in the storage medium 110 may include a commodity number, a volume, a weight, and an inventory level.

In an embodiment, the commodity-score-function may be associated with the historical order information score, the order information, and the commodity information. For example, assuming score is the commodity score, T is the historical order information score, P is a combination of the order information and the commodity information, offset is an exception condition, and t and p are coefficients that may be set. The processor 120 may obtain a commodity score of a commodity a, a commodity score of a commodity b, a commodity score of a commodity c, and a commodity score of a commodity d shown in FIG. 7 by using the following Formula 4. Next, the processor 120 may determine the commodity placement mode according to the commodity scores.

$$\text{score} = t \times T + p \times P + \text{offset} \quad \text{(Formula 4)}$$

In an embodiment, the commodity placement mode determined by the processor 120 is, for example, placing commodities with higher commodity scores close to the picking port, and placing commodities with lower commodity scores farther away from the picking port, but the invention is not limited thereto.

Please refer back to FIG. 2. In Step S240, the processor 120 may use the number of aisles, the number of turnstiles, and the commodity placement mode may be used as a warehouse shelf configuration result.

Figure 8:
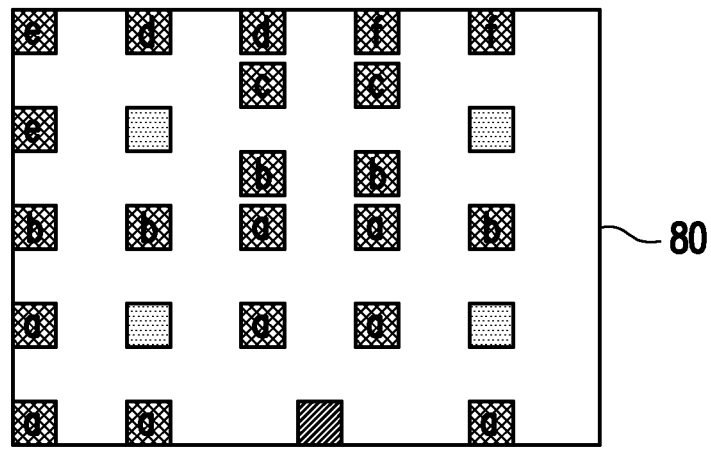
FIG. 8 is a schematic diagram illustrating a warehouse shelf configuration result according to an embodiment of the invention.

FIG. 8 is a schematic diagram illustrating a warehouse shelf configuration result 80 according to an embodiment of the invention. Please refer to FIG. 1, FIG. 6, FIG. 7, and FIG. 8 at the same time. The processor 120 may calculate a commodity score for each commodity by using the order information and the commodity information shown in the above-mentioned Formula 4 and FIG. 7. Then, the processor 120 may determine where in the warehouse-structure-information (with the number of aisles and the number of turnstiles updated) shown in FIG. 6 the commodities are to be placed respectively according to the commodity score for each commodity, so as to obtain the warehouse shelf configuration result 80 as shown in FIG. 8.

In an embodiment, after obtaining the warehouse shelf configuration result, the processor 120 may transmit the warehouse shelf configuration result to the vehicle 200 through the transceiver 130. Next, the vehicle 200 may move the shelves and/or commodities according to the warehouse shelf configuration result.

In an embodiment, the processor 120 may display the warehouse shelf configuration result through the output device 140.

Figure 9:
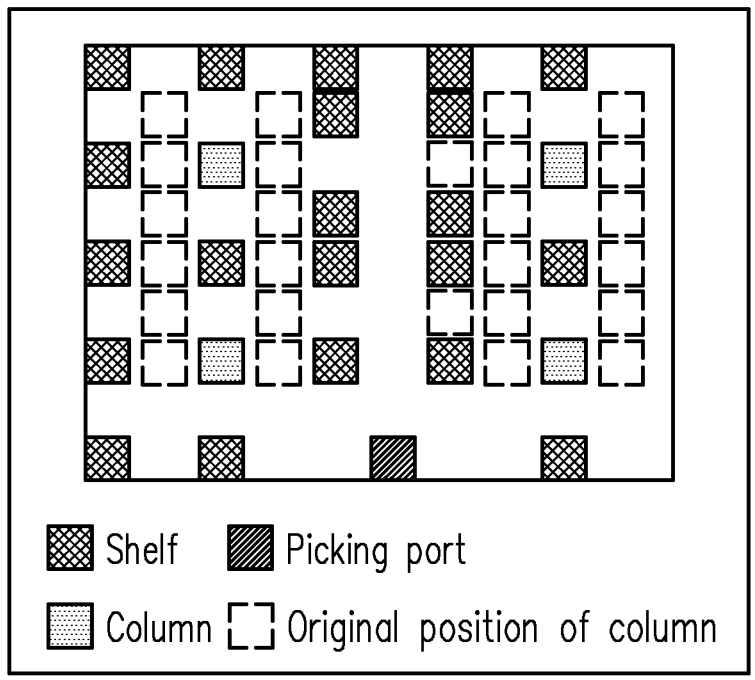
FIG. 9 is a schematic diagram illustrating displaying a warehouse shelf configuration result according to an embodiment of the invention.

FIG. 9 is a schematic diagram illustrating displaying a warehouse shelf configuration result according to an embodiment of the invention. Please refer to FIG. 1, FIG. 8, and FIG. 9 at the same time. In this embodiment, regarding the warehouse shelf configuration result shown in FIG. 8, the processor 120 may display a position of a shelf, a position of a column, and an original position of a column through the output device 140.

Figure 10:
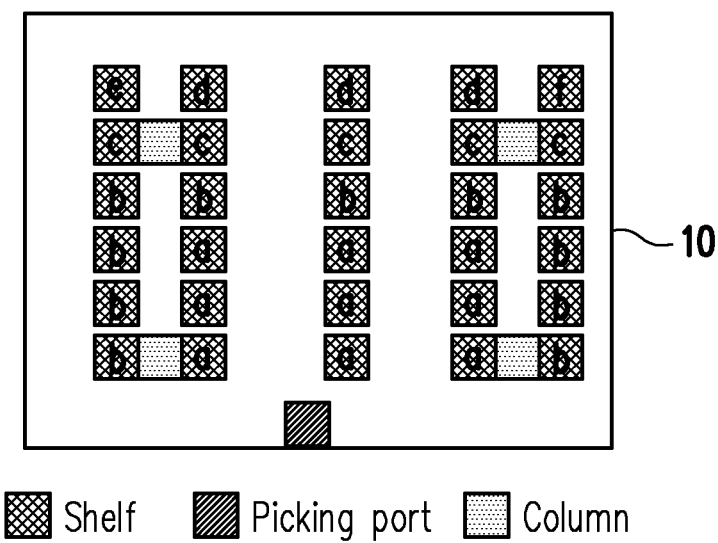
FIG. 10 is a schematic diagram illustrating a comparison of travel distances of a vehicle according to an embodiment of the invention.
Figure 10:
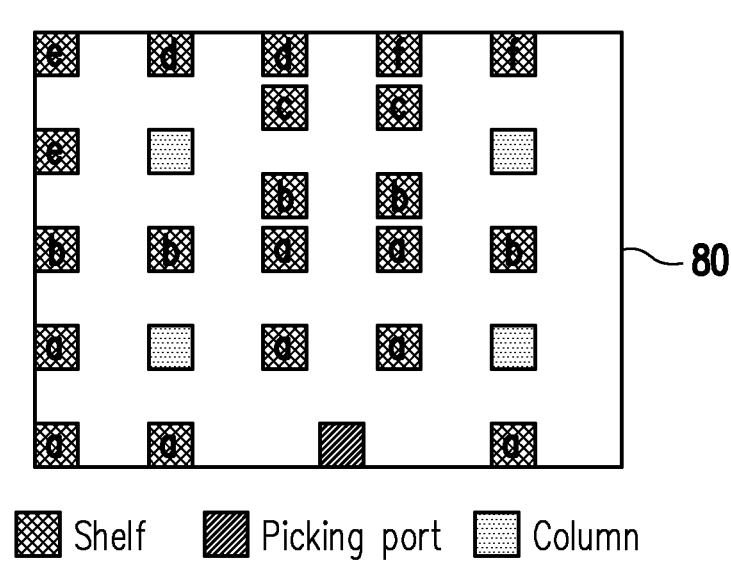

FIG. 10 is a schematic diagram illustrating a comparison of travel distances of the vehicle 200 according to an embodiment of the invention. Please refer to FIG. 1, FIG. 2, FIG. 3, FIG. 7, and FIG. 10 at the same time. It is assumed here that the processor 120 does not obtain the number of aisles and the number of turnstiles by using the (original) warehouse-structure-information shown in FIG. 3 as described in Steps S210 and S220 in FIG. 2. Furthermore, it is assumed that the processor 120 obtains the commodity score for each commodity by using the order information and the commodity information shown in FIG. 7 and the above-mentioned Formula 4 and determines the commodity placement mode according to the commodity scores. Next, the processor 120 may obtain a first result 10 shown in FIG. 10.

Regarding the order information (orders A, B, and C, including 3 commodities a, 2 commodities b, 1 commodity c, 1 commodity d, 1 commodity e, and 1 commodity f in total) in FIG. 7, as shown in FIG. 10, regarding the first result 10, a travel distance required for the vehicle 200 to pick up the orders is 71. On the other hand, for the warehouse shelf configuration result 80, a travel distance required by the vehicle 200 to pick up the orders is 58. In other words, the invention can significantly improve the picking efficiency of the vehicle 200.

In summary, the electronic device and the method for managing the shelf configuration in the warehouse of the invention can obtain the updated number of aisles and number of turnstiles by using the number-of-aisles-optimization-function and the number-of-turnstiles-optimization-function. Furthermore, the commodity placement mode can also be obtained by using the commodity-score-function. Based on this, the operational efficiency of the warehouse and the efficiency of the vehicle to store and pick orders can be improved. The invention achieves an optimal warehousing shelf configuration and obtains the most efficient shelf configuration, the maximized storing and picking efficiency, and the maximized inventory space utilization after considering information such as orders in the warehouse, commodity inventory, picking equipment operation status, and overall space. The picking volume and inventory capacity of the entire factory area can be greatly improved without increasing any manpower or equipment resources.

Although the invention has been disclosed above with the embodiments, the embodiments are not intended to limit the invention. Anyone with ordinary knowledge in the technical field may make some changes and modifications without departing from the spirit and scope of the invention. The scope of protection of the invention should be defined by the scope of the appended claims.

What is claimed is:

1. An electronic device for managing a shelf configuration in a warehouse, comprising:

a storage medium, storing warehouse-structure-information of the warehouse, order information, and commodity information; and a processor, coupled to the storage medium and configured to:

obtain a number of aisles by using a number-of-aisles-optimization-function associated with the warehouse-structure-information;

obtain a number of turnstiles by using a number-of-turnstiles-optimization-function associated with the warehouse-structure-information;

obtain a commodity placement mode by using a commodity-score-function associated with the order information and the commodity information; and use the number of aisles, the number of turnstiles, and the commodity placement mode as a warehouse shelf configuration result.

2. The electronic device according to claim 1, wherein the warehouse-structure-information indicates a number of at least one picking port, a warehouse width, an aisle width, and a shelf width, wherein the number-of-aisles-optimization-function is associated with the number of at least one picking port, the warehouse width, the aisle width, and the shelf width.

3. The electronic device according to claim 1, wherein the storage medium further stores a number of shelves in the warehouse, wherein the warehouse-structure-information indicates a warehouse length, an aisle width, and a shelf width, and the number-of-turnstiles-optimization-function comprises a first number-of-turnstiles-optimization-function, wherein the first number-of-turnstiles-optimization-function is associated with the warehouse length, the aisle width, the shelf width, the number of aisles, and the number of shelves.

4. The electronic device according to claim 1, wherein the warehouse-structure-information indicates a warehouse width, a number of at least one picking port, an aisle width, and an aisle spacing, and the number-of-turnstiles-optimization-function comprises a second number-of-turnstiles-optimization-function, wherein the second number-of-turnstiles-optimization-function is associated with the number of aisles, the warehouse width, the number of at least one picking port, the aisle width, and the aisle spacing.

5. The electronic device according to claim 1, wherein the storage medium further stores a historical order information score, wherein the commodity-score-function is associated with the historical order information score, the order information, and the commodity information.

6. The electronic device according to claim 1, further comprising a transceiver coupled to the processor, wherein the transceiver is communicatively connected to a vehicle, wherein the processor is further configured to:

transmit the warehouse shelf configuration result to the vehicle through the transceiver.

7. The electronic device according to claim 1, further comprising an output device coupled to the processor, wherein the processor is further configured to:

display the warehouse shelf configuration result through the output device.

8. A method for managing a shelf configuration in a warehouse, adapted to be executed by an electronic device, wherein the electronic device comprises a storage medium, and the storage medium stores warehouse-structure-information of the warehouse, order information, and commodity information, wherein the method comprises:

obtaining a number of aisles by using a number-of-aisles-optimization-function associated with the warehouse-structure-information;

obtaining a number of turnstiles by using a number-of-turnstiles-optimization-function associated with the warehouse-structure-information;

obtaining a commodity placement mode by using a commodity-score-function associated with the order information and the commodity information; and using the number of aisles, the number of turnstiles, and the commodity placement mode as a warehouse shelf configuration result.

9. The method according to claim 8, wherein the warehouse-structure-information indicates a number of at least one picking port, a warehouse width, an aisle width, and a shelf width, wherein the number-of-aisles-optimization-function is associated with the number of at least one picking port, the warehouse width, the aisle width, and the shelf width.

10. The method according to claim 8, wherein the storage medium further stores a number of shelves in the warehouse, wherein the warehouse-structure-information indicates a warehouse length, an aisle width, and a shelf width, and the number-of-turnstiles-optimization-function comprises a first number-of-turnstiles-optimization-function, wherein the first number-of-turnstiles-optimization-function is associated with the warehouse length, the aisle width, the shelf width, the number of aisles, and the number of shelves.

11. The method according to claim 8, wherein the warehouse-structure-information indicates a warehouse width, a number of at least one picking port, an aisle width, and an aisle spacing, and the number-of-turnstiles-optimization-function comprises a second number-of-turnstiles-optimization-function, wherein the second number-of-turnstiles-optimization-function is associated with the number of aisles, the warehouse width, the number of at least one picking port, the aisle width, and the aisle spacing.

12. The method according to claim 8, wherein the storage medium further stores a historical order information score, wherein the commodity-score-function is associated with the historical order information score, the order information, and the commodity information.

13. The method according to claim 8, wherein the electronic device further comprises a transceiver, wherein the method further comprises:

transmitting the warehouse shelf configuration result to a vehicle through the transceiver.

14. The method according to claim 8, wherein the electronic device further comprises an output device, wherein the method further comprises:

displaying the warehouse shelf configuration result through the output device.

* * * * *